US006382691B2

(12) United States Patent
Hazelton

(10) Patent No.: US 6,382,691 B2
(45) Date of Patent: May 7, 2002

(54) METHOD AND DETACHABLE HANDLE SUPPORT FOR CARRYING CONTAINERS

(76) Inventor: Alan Roger Hazelton, 700 74th Ave. N., Brooklyn Park, MN (US) 55435

( * ) Notice: Subject to any disclaimer, the term of this patent is extended or adjusted under 35 U.S.C. 154(b) by 0 days.

(21) Appl. No.: 09/329,878

(22) Filed: Jun. 11, 1999

(51) Int. Cl.[7] .............................. B65G 7/12; E06C 7/14
(52) U.S. Cl. ......................... 294/31.2; 294/15; 248/210
(58) Field of Search ........................... 294/15, 16, 27.1, 294/29.32, 31.2, 164, 165; 248/210, 211, 311.2, 312.1; 220/758, 759, 769; 16/425, 430

(56) References Cited

U.S. PATENT DOCUMENTS

| | | | | | |
|---|---|---|---|---|---|
| 1,363,928 | A | * | 12/1920 | Shirkey | 294/32 |
| 1,437,171 | A | | 11/1922 | Currey | |
| 1,593,043 | A | | 7/1926 | Stroecker | |
| 1,867,571 | A | | 7/1932 | Jelinek | |
| 2,262,273 | A | | 11/1941 | Ferrara | |
| 2,425,395 | A | * | 8/1947 | Root | 294/32 |
| 2,493,751 | A | | 1/1950 | Davis | |
| 2,541,390 | A | | 2/1951 | Weigand | |
| 2,610,885 | A | | 9/1952 | Hayden | |
| 2,808,285 | A | | 10/1957 | Robuck | |
| 2,993,672 | A | | 7/1961 | Bower et al. | |
| 3,202,309 | A | * | 8/1965 | Simpson | 294/31.2 |
| 3,304,112 | A | | 2/1967 | Elliott | |
| 4,045,069 | A | | 8/1977 | Fife | |
| 4,387,922 | A | | 6/1983 | Geisinger | |
| 4,396,174 | A | | 8/1983 | Continenza et al. | |
| 4,433,822 | A | * | 2/1984 | Caggiano | 248/210 |
| 4,511,167 | A | | 4/1985 | Kawaquchi | |
| 4,565,397 | A | * | 1/1986 | Keen | 294/31.2 |
| 4,577,897 | A | * | 3/1986 | Mazac | 294/15 |
| 4,676,392 | A | | 6/1987 | Giggard et al. | |
| 4,872,583 | A | | 10/1989 | Zelenka et al. | |
| 4,874,109 | A | | 10/1989 | Cook | |
| 5,133,525 | A | * | 7/1992 | Good | 248/210 |
| 5,145,226 | A | | 9/1992 | LaFontaine | |
| 5,203,471 | A | | 4/1993 | Widman | |
| 5,335,954 | A | | 8/1994 | Holub et al. | |
| 5,730,479 | A | * | 3/1998 | Jansson | 294/31.4 |

FOREIGN PATENT DOCUMENTS

| | | | | |
|---|---|---|---|---|
| AU | 141320 | * | 7/1949 | 294/31.2 |
| CA | 663346 | * | 5/1963 | 294/31.2 |
| CH | 249832 | * | 5/1948 | 294/27.1 |

* cited by examiner

*Primary Examiner*—Dean J. Kramer
(74) *Attorney, Agent, or Firm*—Michael A. Mochinski

(57) ABSTRACT

The present invention provides a method and detachable handle support for carrying paint containers and the like. The detachable handle support comprises an elongated rigid member having a lower portion and an upper portion. The lower portion includes protruding sections and a pair of convexly curved lateral arms for embracing the outer side wall of a paint container. The rigid member is positioned parallel to the longitudinal central axis of the paint container, with the upper portion of the rigid member extending to a predetermined length above the uppermost portion of the paint container. A handle is attached to the upper portion for carrying the rigid member, with the handle being positioned substantially normal to the upper portion and extending radially inward over the uppermost portion of the paint container. A plurality of annular bands are pivotally attached to the lower portion of the rigid member and are adapted to extend circumferentially about the paint container to securely embrace the outer side wall of the container to the convexly curved lateral arms. The annular bands are sized to accommodate one-quart and one-gallon paint containers, as well as other containers of different sizes, and are capable of being folded within one another for convenient storage.

20 Claims, 5 Drawing Sheets

METHOD AND DETACHABLE HANDLE SUPPORT FOR CARRYING CONTAINERS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to a method and detachable handle support for carrying containers. More particularly, the present invention relates to an improved detachable handle support adapted for use in carrying containers containing paint or similar substances, as well as means for mounting the container to a ladder rung or similar device capable of supporting the detachable handle support.

BACKGROUND OF THE INVENTION

It is generally understood that homeowners as well as professional painters often apply paint and other liquid coating materials directly from the original can onto the work surface. The can, which is often integrally equipped with a wire bail, is held by one hand while a paint brush is held in the other hand to transfer the liquid coating material from the container onto the work surface.

A quart container has a diameter that is somewhat greater than the normal gripping capacity of an average person. Because the average person's hand cannot effectively encircle the container, it becomes rather difficult for the average person to maintain an adequate grasp on the container for any length of time. Although a gallon container often poses a similar problem, it is the weight of the container combined with a wire bail that makes painting for any length of time a laborious chore.

Many forms of attachments and brackets have been developed in the attempt to provide a satisfactory solution to the problem. However, many are too costly to be commercially feasible, too complicated for general use, do not sufficiently secure the paint container, or otherwise have disadvantages which make them impractical for use by the do-it-yourself and/or professional painter.

BRIEF SUMMARY OF THE INVENTION

It is thus an object of the present invention to provide a low cost non-complicated detachable handle support which may be reliably and securely attached to a paint container so that it may be readily and easily usable.

It is another object of the present invention to provide such a detachable handle support which reliably allows the paint container to be readily, easily, and securely mounted to a ladder rung or similar device.

It is another object of the present invention to provide such a detachable handle support which positions the wire bail mounted on the paint container to a lower position, away from the point of accessing the substances contained in the container.

It is another object of the present invention to provide such a detachable handle support which is positioned away from the opening of the container to prevent the person's hands from coming into contact with drippings of paint.

It is another object of the present invention to provide such a detachable handle support which can be adapted for use on containers of various sizes.

It is another object of the present invention to provide such a detachable handle support which is easily mounted on and detached from a container.

It is yet another object of the present invention to provide such a detachable handle support which has the foregoing and other objects and advantages and which is economical, durable, and fully effective in performing its intended functions.

In accordance with the present invention, a detachable handle support for containers comprises an elongated rigid member having a lower portion and an upper portion. The lower portion includes protruding sections for embracing an outer side wall of a paint container, while the upper portion extends in the opposite direction of the lower portion. The rigid member is positioned parallel to the longitudinal central axis of the paint container, with the upper portion of the rigid member extending a predetermined length above the uppermost portion of the paint container.

A handle is attached to the upper portion for carrying the rigid member, with the handle being positioned substantially normal to the upper portion and extending radially inward over the uppermost portion of the paint container. Alternatively, a T-shaped handle, which includes first and second handle ends, is attached to the upper portion in such a manner that the first handle and second handle ends are equidistant from the upper portion of the rigid member. The upper portion is positioned substantially perpendicular to the T-shaped handle to permit the first and second handle ends to engage a ladder rung, a person's hand, or similar device capable of supporting the handle ends.

A plurality of annular bands are pivotally attached to the rigid member to permit the annular bands to be relatively turned from an outwardly disposed position to accept the paint container to an inwardly disposed position relative to the rigid member. The annular bands are adapted to extend circumferentially about the paint container to securely embrace the outer side wall of the container to the protruding surface and lateral arms of the lower portion. The annular bands are placed in proximity to the uppermost portion of the paint container, below the upper annular ridge of the paint container to prevent slippage of the paint container during transport. The annular bands are sized to permit the annular bands to be folded within one another for convenient storage.

Other objects, features, and advantages of the present invention will become apparent in the following detailed description of the preferred embodiments thereof when read in conjunction with the accompanying drawings in which like reference numerals depict the same parts in the various views.

DETAILED DESCRIPTION OF THE INVENTION

Figure 1:
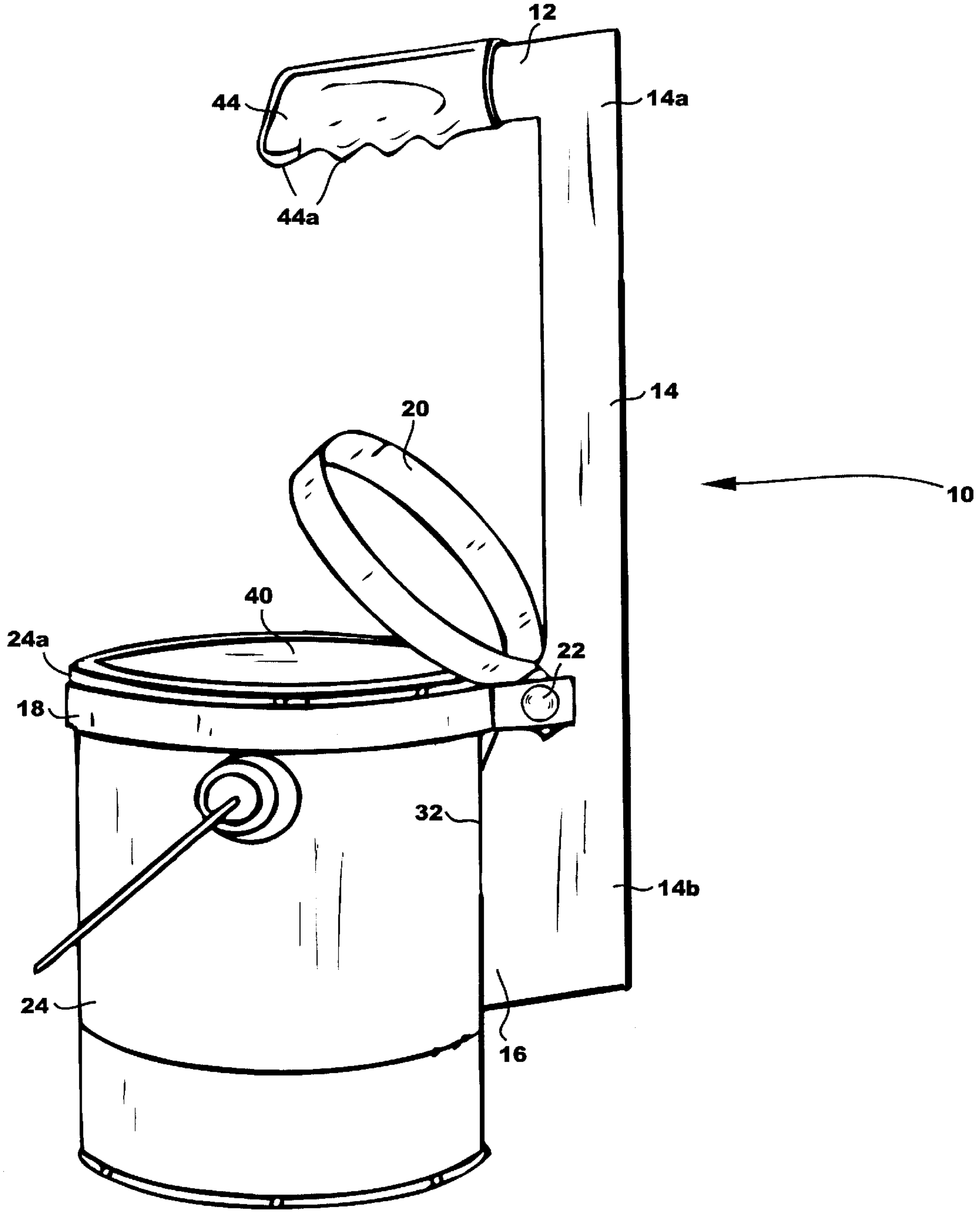
FIG. 1 is a side view of the preferred embodiment of the detachable handle support which is illustrated attached to a paint container.

While this invention is susceptible of being embodied in many different forms, preferred embodiment of the invention is shown in the drawings and described in detail hereinafter with the understanding that the present disclosure is to be considered to exemplify the principles of the present invention and is not intended to limit the invention to the embodiment illustrated. The present invention has particular utility as a holder for paint containers and will be described as such although the present invention may be used equally well for holding other types of containers.

Referring to FIG. 1, there is shown generally at 10 a detachable handle support for attachment to a paint container, illustrated at 24, which may be a conventional one-gallon container having a conventional upper annular ridge 24*a* for receiving a lid. While the present invention is described specifically for use with one-quart and one-gallon paint containers, it should be noted that the teachings hereof may be used to provide the invention for use with paint containers of other sizes.

The preferred embodiment of the detachable container support 10 comprises an elongated rigid member 14, a handle 12, a protruding section 16, and a plurality of annular bands that extend circumferentially about the paint container. Although the elongated rigid member 14, the handle 12, and the protruding sections 16 may be composed of more than one piece suitably rigidly joined, it is preferable that they are injected molded as a single piece composed of a suitable material such as PVC (polyvinylchloride) material having a holding strength capability sufficient for the weight of the paint container to be picked up thereby. For example, for a one-gallon paint container, the holding strength capability may perhaps be sufficient to hold two gallons of paint, thus allowing a margin of safety. It should be understood, however, that any other suitable rigid material may be used for the elongated rigid member.

Figure 5:
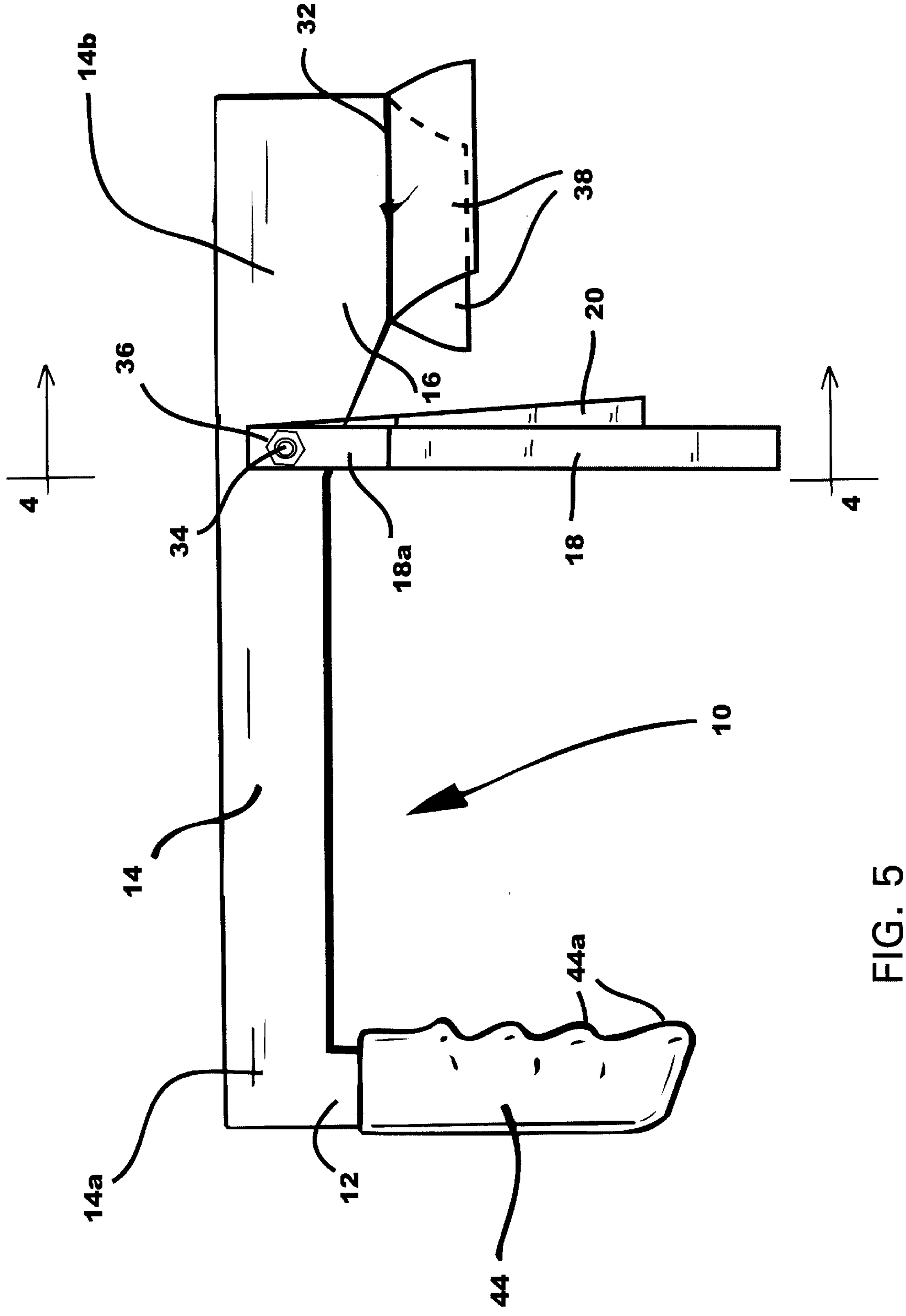
FIG. 5 is side view of the third embodiment of the detachable handle support illustrating the annular bands in an outwardly disposed position.

The elongated rigid member 14 which, when the detachable handle support is attached to the paint container, extends along the outer side wall of the paint container 24, parallel to the longitudinal central axis of the paint container, and above the uppermost portion 40 of the paint container. The rigid member 14 includes an upper portion 14*a* and a lower portion 14*b,* wherein the lower portion is attached to the protruding section 16 having a leading edge 32 engaged with that of the outer side wall of the paint container. Preferably, the leading edge 32 of the protruding section, which is entirely in contact with the outer side wall of the paint container, is convexly shaped 42 to conform to the outer side wall of the paint container to enhance stability of the paint container during transport. To provide even greater stability during transport of the container, the third embodiment of the detachable handle support includes a pair of convexly curved lateral arms 38 attached to the leading edge 32 of the protruding section 16 for embracing the outer side wall of the container, as best illustrated in FIG. 5. The lateral arms 38 are spaced outwardly of the protruding section an amount such that each arm extends approximately two inches from the longitudinal central axis of the leading edge 32.

The upper portion 14*a* of the rigid member 14 extends in the opposite direction of the lower portion 14*b.* The rigid member is positioned parallel to the longitudinal central axis of the paint container, with the upper portion 14*a* of the rigid member extending to a predetermined length above the uppermost portion 40 of the paint container. It is preferable that the distance between the upper portion of the rigid member and uppermost portion of the paint container be of a sufficient distance to accommodate the diameter of the annular bands 18 and 20 should the annular bands be disposed in an inwardly position in proximity to the rigid member 14, below the position of the handle 12, shown most clearly in FIG. 2.

The handle 12 is attached to the upper portion for carrying the rigid member, with the handle being positioned substantially normal to the upper portion and extending radially inward over the uppermost portion 40 of the paint container to permit proper balance of the container during transport and to provide leverage of the protruding section 16 against the outer side wall of the container 24, as seen in FIG. 1.

Figure 3:
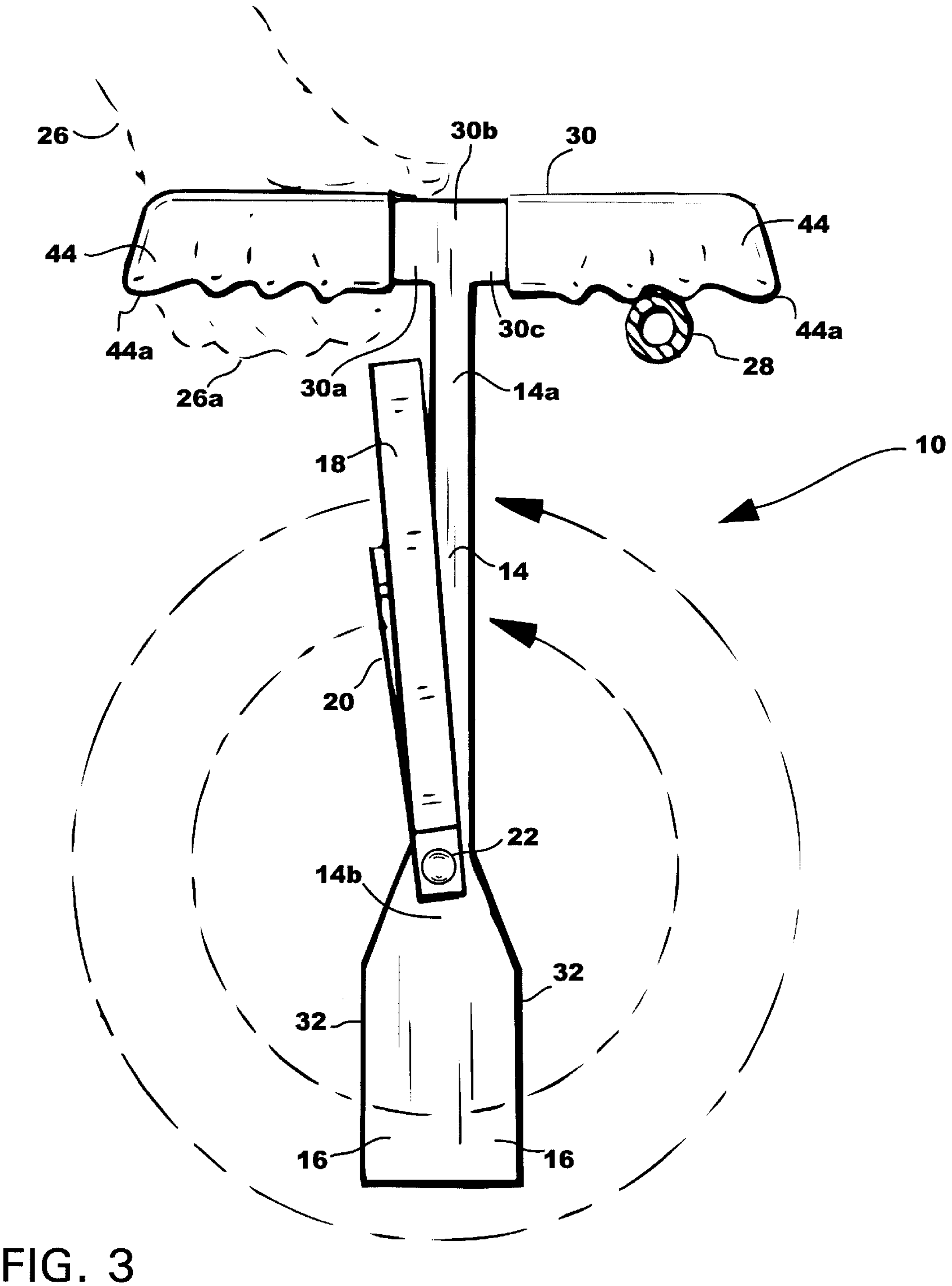
FIG. 3 is a side view of the second embodiment of the detachable handle support engaged with and supported on a ladder rung and a person's hand and which is illustrating movement of the annular bands.

As an alternative second embodiment of the present invention, the detachable handle support includes a T-shaped handle 30 having a first handle end 30*a,* a middle portion 30*b,* and a second handle end 30*c,* wherein the middle portion is attached to the upper portion 14*a* of the rigid member in such a manner that the first and second handle ends are equidistant from the upper portion 14*a* of the rigid member 14, and a pair of protruding sections 16 being substantially opposed to one another, as best illustrated in FIG. 3. The upper portion is positioned substantially perpendicular to the T-shaped handle 30 to permit the first handle 30*a* and second handle ends 30*c* to engage a person's hand 26, a ladder rung 28 or similar device capable of supporting the handle ends. The handle 12 is fitted with a grip 44 having a series of finger-like projections 44*a* extending downwardly therefrom in such a manner to conform to the fingers 26*a* of a person's hand 26 to permit greater comfort in carrying the paint container for any length of time. Similarly, the first 30*a* and second 30*c* handle ends include grips 44, as best illustrated in FIG. 3. Preferably, the grip 44 as well as the finger-like projections 44*a* are injected molded as a single piece. Plastic, such as PVC, rubber, such as latex, and wood, shaped to conform to a person's fingers, are recognized as suitable materials for making the grip.

Figure 4:
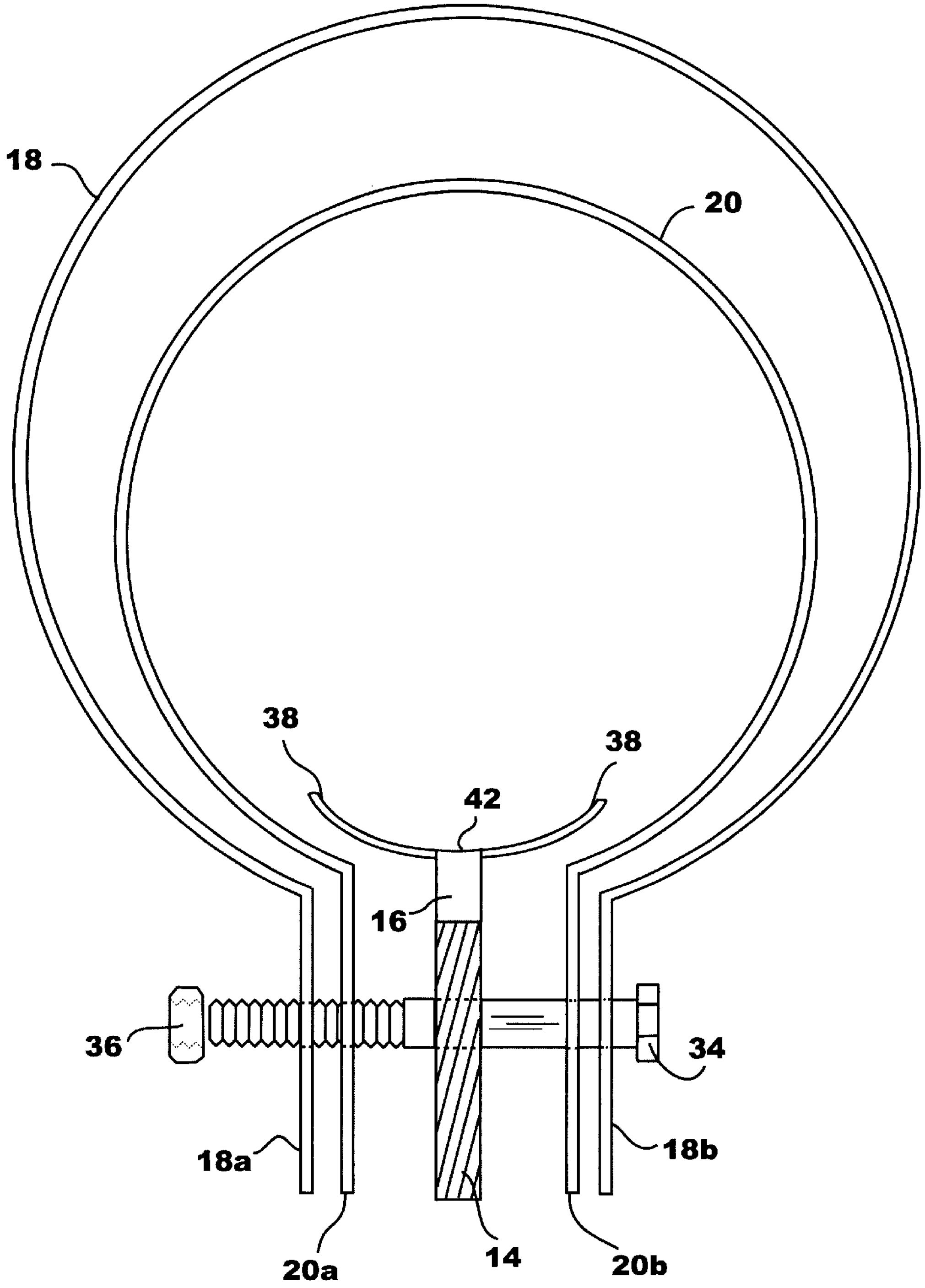
FIG. 4 is a section view taken along line 4—4 of FIG. 5.

An annular band 18 includes a first end 18a and a second end 18*b*, wherein the first and second ends of the annular band are radially bent outward from the annular band to lay flush along the side of the rigid member, as illustrated in FIG. 4, and are pivotally attached to the rigid member to permit the annular band to be relatively turned from an outwardly disposed position to accept the paint container 24 to an inwardly disposed position relative to the rigid member 14, as best shown in FIG. 1. The annular band 18 is adapted to extend circumferentially about the paint container to securely embrace the outer side wall of the container to the protruding section 16 of the lower portion 14*b* of the rigid member. Preferably, each of the annular bands are slightly larger than the upper annular ridge 24*a* of the container to permit easy installation and removal of the annular bands from the container. The annular band is placed in proximity to the uppermost portion of the paint container 40, immediately below the upper annular ridge 24*a* of the paint container to prevent slippage of the paint container 24 during transport.

A second annular band 20 includes a first end 20*a* and a second end 20*b,* wherein the first and second ends of the second annular band 20 are pivotally attached to the rigid member to permit the second annular band to be relatively turned from an outwardly disposed position to accept the paint container to an inwardly disposed position relative to the rigid member, as best shown in FIG. 1. The second annular band 20 is adapted to extend circumferentially about the paint container to securely embrace the outer side wall of the paint container to the leading edge 32 of the protruding sections 16 of the lower portion 14*b* of the rigid member. The second annular band 20, when installed on the container, is located in proximity to the uppermost portion 40 of the paint container, immediately below the upper annular ridge 24*a* of the container to prevent slippage of the paint container during transport. The annular bands are sized to accommodate one-quart and one-gallon paint containers and to permit the annular bands to be folded within one another for convenient storage, as illustrated in FIGS. 2 and 3.

Figure 2:
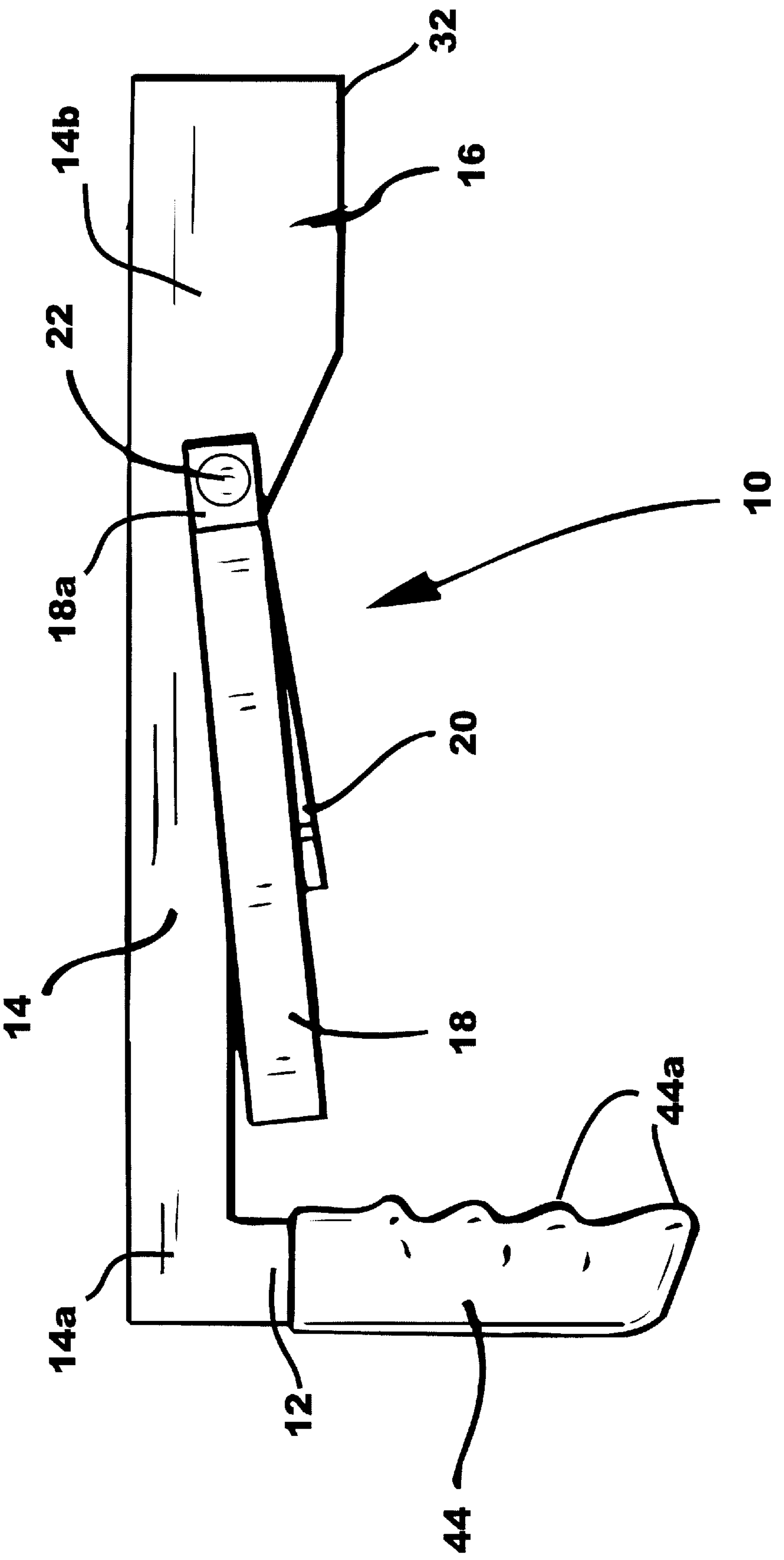
FIG. 2 is a side view of the preferred embodiment of the detachable handle support illustrating the annular bands in a collapsible, inoperative position.

Rivet pin connection 22 is used at the rigid member 14 and passes therethrough as well as through the first 20*a* and second 20*b* ends of the annular bands 20 and the first 18*a* and second 18*b* ends of the second annular band 18, as illustrated in FIG. 2. This configuration serves as a pivotal connection fastening the rigid member to the annular band ends to allow the annular bands to be disposed in a relatively aligned relation or to permit the annular bands to be relatively turned from an outwardly disposed position to receive the paint container or to an inwardly disposed position relative to the rigid member 14, as illustrated in FIGS. 2 and 3. The first and second ends of the annular bands 18 and 20 are pivotally fastened at the same location in proximity to the uppermost portion 40 of the paint container, near the upper annular ridge 24*a* of the paint container. Preferably, a bolt 34 and nut 36 arrangement is used at the rigid member 14 and passes therethrough as well as through the first 20*a* and second 20*b* ends of the annular band 20 and the first 18*a* and second 18*b* ends of the second annular band 18 to serve as a pivotal connection, as shown in FIG. 4.

The annular band 18 is of a relative like material and width as the second annular band 20 formed from a given length to extend circumferentially about the paint container, with its ends just slightly overlapping at the pivot or hinge connection, as best depicted in FIG. 4. Alternatively, it may be made as one continuous closed band, as a manufacturing alternative, if desired. The annular bands are preferably constructed from heavy-gauge, metal-bearing material which permits the annular bands to be molded or bent to conform to the cylindrical shape of the paint container and to permit the first and second ends of each of the annular bands to meet at the pivot connection located at the rigid member 14. Such metal-bearing material may consist of stainless steel, aluminum, carbon steel, platinum, or any type of alloy that can be stamped and formed without losing substantial tensile strength. Although a metal-bearing material is preferred, plastic-bearing material, molded to the shape of the annular band, may be used to lessen production costs. However, this type of material must be capable of withstanding tensile forces that may be exerted when carrying heavy containers such as one-gallon paint containers filled to capacity.

In view of the foregoing, those skilled in the art will also recognize that the present invention also provides a preferred method of using the detachable handle support, a method of which consist of disposing the annular band 18 in an outwardly position, approximately 45 degrees relative to the longitudinal central axis of the rigid member 14, while the second annular band 20 is disposed in an inwardly position in proximity to the rigid member, below the handle 12 or the first 30*a* or second 30*c* handle ends. To permit greater access to the entrance of the paint container, the second annular band 20 is positioned to the back side of the rigid member, on the opposite side where the paint container is positioned relative to the rigid member. This desirable position is accomplished by swinging the second annular band downward toward and beyond the lower portion 14*b* of the rigid member 14 and continuing this swinging action until the second annular band is substantially in contact with the back side of the rigid member 14, as best shown in FIG. 3. After positioning the annular bands relative to the rigid member, the annular band is fitted around the uppermost portion 40 of the paint container and positioned below the upper annular ridge 24*a* of the paint container. Once the annular band is in place, the handle 12 attached to the rigid member is cocked away from the outer side wall of the paint container toward the user until the leading edge 32 or the lateral arms 38 attached to the protruding section 16 come into contact with the outer side wall of the paint container 24, as best illustrated in FIG. 1. The methodology employed for installing the annular band 18 onto the container can equally be applied to installing the second annular band 20, as well as other sized annular bands, onto the container.

To disengage the detachable handle support, the paint container is positioned firmly on a solid surface. The rigid member is then pushed forward, away from the user toward the paint container, until the rigid member is approximately 45 degree with that of the annular band attached to the container. Once in this position, the detachable handle support is removed from the paint container by simply lifting upward and forward toward the paint container, away from the user.

It is obvious that the detachable handle support hereinbefore described can be used with various sizes of containers by simply exchanging the size of the annular band.

It can be seen from the foregoing that there is provided in accordance with this invention a simple and easily operated paint can holding device, which is particularly suitable for use in holding and carrying paint containers. The device is inexpensive to manufacture and can be sold at a nominal price. Furthermore, the detachable handle support is adaptable for use with other containers of varying size. Also, an economical approach has been disclosed for manufacturing the handle, rigid member, protruding section, and lateral arms from a single stamping which permits inexpensive manufacture of the detachable handle support.

It is obvious that the detachable handle support may be fabricated by other methods than that disclosed and that detachable handle support can be made of metal, plastic or other suitable materials.

While there has been shown and described a particular embodiment of the invention, it will be obvious to those skilled in the art that various changes and alterations can be made therein without departing from the invention and, therefore, it is aimed in the appended claims to cover all such changes and alterations as fall within the true spirit and scope of the invention.

What is claimed is:

1. A detachable handle support for carrying containers having an upper annular ridge, said support comprising:

an elongated rigid member including a lower portion and an upper portion, said lower portion having a protruding section capable of embracing an outer sidewall of a container, said upper portion extending in the opposite direction of said lower portion, said rigid member being adaptably positioned parallel to the longitudinal central axis of the container with said upper portion of said rigid member extending a predetermined length above the uppermost portion of the container; and an annular band having a first end and a second end, wherein said first and second ends of said annular band are pivotally attached to said rigid member to permit said annular band to be relatively turned from an outwardly disposed position to accept the container to an inwardly disposed position relative to said rigid member, said annular band being adapted to extend circumferentially about the container to securely embrace the outer sidewall of the container to said protruding section of said lower portion, said annular band being placed in proximity to the uppermost portion of the container, below the upper annular ridge of the container to prevent slippage of the container from said annular band during transport, whereby said protruding section and said annular band are collectively configured to stabilize and support the container without the use of a bottom support member or foot.

2. A detachable handle support for carrying containers having an upper annular ridge as defined in claim 1, further comprising a handle attached to said upper portion for carrying said rigid member, said handle being substantially normal to said upper portion and extending radially inward over the uppermost portion of the container.

3. A detachable handle support for carrying containers having an upper annular ridge as defined in claim 2, further comprising a grip having a series of finger-like projections extending downwardly therefrom to fit between a person's fingers, said grip being substantially fitted about said handle to enhance comfort in carrying the container.

4. A detachable handle support for carrying containers having an upper annular ridge as defined in claim 1, wherein said first and second ends of said annular band are pivotally attached to said rigid member by means of a rivet.

5. A detachable handle support for carrying containers having an upper annular ridge as defined in claim 1, wherein said first and second ends of said annular band are pivotally attached to said rigid member by means of a nut and bolt arrangement.

6. A detachable handle support for carrying containers having an upper annular ridge as defined in claim 1, wherein said annular band is made of metal-bearing material capable of being molded circumferentially about the container to permit said first and second ends of said annular band to meet flush at said rigid member and permit pivotal attachment thereto.

7. A detachable handle support for carrying containers having an upper annular ridge as defined in claim 1, wherein said first and second ends of said annular band are pivotally attached to said rigid member at a location in proximity to the uppermost portion of the container.

8. A detachable handle support for carrying containers having an upper annular ridge as defined in claim 1, wherein said protruding surface is convexly shaped to conform to the side of the container to secure said protruding section to the side of the container for added stability to the container during transport.

9. A detachable handle support for carrying containers having an upper annular ridge as defined in claim 1, further comprising a pair of convexly curved lateral arms extending outwardly from said protruding section capable of embracing the outer side wall of the container, said lateral arms being shaped to adaptably conform to the outer side wall of the container to provide added stability to the container during transport thereof.

10. A detachable handle support for carrying containers having an upper annular ridge as defined in claim 1, further comprising a second annular band having a first end and a second end, wherein said first and second ends of said second annular band are pivotally attached to said rigid member to permit said second annular band to be relatively turned from an outwardly disposed position to accept the container to an inwardly disposed position relative to said rigid member, said second annular band adapted to extend circumferentially of the container to securely embrace the outer side wall of the container to said protruding section of said lower portion, said second annular band being placed in proximity to the uppermost portion of the container, below the upper annular ridge of the container to prevent slippage of the container from said second annular band during transport thereof.

11. A detachable handle support for carrying containers having an upper annular ridge as defined in claim 10, wherein said first and second ends of second annular band are pivotally attached to said rigid member by means of a rivet.

12. A detachable handle support for carrying containers having an upper annular ridge as defined in claim 10, wherein said first and second ends of second annular band are pivotally attached to said rigid member by means of a bolt and nut arrangement to permit easy installation and removal of said second annular band from said rigid member.

13. A detachable handle support for carrying containers having an upper annular ridge as defined in claim 10, wherein said first and second ends of second annular band are pivotally attached to said rigid member at a location in proximity to the uppermost portion of the container.

14. A method of carrying containers having an upper annular ridge, comprising the steps of:

disposing an annular band pivotally connected to an elongated rigid member in an outwardly position, approximately 45 degrees relative to said annular band to permit added clearance to accept the container, fitting said annular band around the circumference of the container, positioning said annular band below the annular ridge of the container to secure the container to said rigid member and to prevent slippage thereof during transport, and moving said rigid member to a position that permits a protruding section attached to a lower portion of said rigid member to come substantially into contact with and embrace the container's sidewall, whereby said protruding section and said annular band are collectively configured to stabilize and support the container without the use of a bottom support member or foot.

15. The method of carrying containers having an upper annular ridge as defined in claim 14, wherein said rigid member includes a handle attached to an upper portion of said rigid member, said handle being substantially normal to said upper portion and extending radially inward over the uppermost portion of the container.

16. The method of carrying containers having an upper annular ridge as defined in claim 14, wherein said protruding section includes a pair of convexly curved lateral arms extending outwardly therefrom, of which are substantially capable of embracing and conforming to the outer side wall of the container.

17. A detachable handle support for carrying containers having an upper annular ridge, said support comprising:

an elongated rigid member including a lower portion and an upper portion, said lower portion having a pair of protruding sections outwardly extending from one another to adaptably embrace an outer side wall of a container, said upper portion extending in the opposite direction of said lower portion, said rigid member being positioned substantially parallel to the longitudinal central axis of the container, with said upper portion of said rigid member extending a predetermined length above the uppermost portion of the container, a T-shaped handle having a middle portion, a first handle end, and second handle end, said middle portion being attached to said upper portion in such a manner that said first handle and second handle ends are equidistant from said upper portion of said rigid member, said upper portion being positioned substantially perpendicular to said handle to permit said first and second handle ends to engage a person's hand, a ladder rung or similar device capable of supporting said handle ends;

a grip having a series of finger-like projections extending downwardly therefrom to fit between a person's fingers, said grip being substantially fitted about said handle ends to enhance comfort in carrying the container; and a plurality of annular bands each having a first end and a second end, wherein said first and second ends of said annular bands are pivotally fastened to said rigid member to permit said annular bands to be relative turned from an outwardly disposed position to accept the container to an inwardly disposed position relative to said rigid member, said annular bands adapted to extend circumferentially about the container to securely embrace the outer side wall of the container to said protruding sections of said lower portion, said annular bands being placed in proximity to the uppermost portion of the container, below the upper annular ridge of the container to prevent slippage of the container from said annular bands during transport thereof, said annular bands being sized to permit said annular bands to be folded within one another for convenient storage.

18. A detachable handle support for carrying containers having an upper annular ridge as defined in claim 17, wherein said annular bands are relatively sized to permit said annular bands to pass by said lower portion of said rigid member such that said annular bands can be positioned away from said handle and said upper portion of said rigid member to provide unobstructed access to the container's contents.

19. A detachable handle support for carrying containers having an upper annular ridge as defined in claim 17, wherein said first and second ends of said annular bands are pivotally fastened at the same location in proximity to the uppermost portion of the container, near the upper annular ridge of the container.

20. A detachable handle support for carrying containers having an upper annular ridge as defined in claim 17, wherein said annular bands are sized to accommodate one-quart and one-gallon containers.

* * * * *